(12) United States Patent
Zhao

(10) Patent No.: US 9,798,212 B2
(45) Date of Patent: Oct. 24, 2017

(54) LIQUID CRYSTAL DISPLAY DEVICE USING DIFFERENT HANDEDNESS CHOLESTERIC LIQUID CRYSTALS

(71) Applicant: BOE Technology Group Co., Ltd., Beijing (CN)

(72) Inventor: Weili Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 5 days.

(21) Appl. No.: 13/995,949

(22) PCT Filed: Nov. 6, 2012

(86) PCT No.: PCT/CN2012/084117
§ 371 (c)(1),
(2) Date: Jun. 19, 2013

(87) PCT Pub. No.: WO2014/012307
PCT Pub. Date: Jan. 23, 2014

(65) Prior Publication Data
US 2014/0055730 A1 Feb. 27, 2014

(30) Foreign Application Priority Data
Jul. 20, 2012 (CN) .......................... 2012 1 0259507

(51) Int. Cl.
*G02F 1/137* (2006.01)
*G02F 1/1335* (2006.01)
*G02F 7/00* (2006.01)
(52) U.S. Cl.
CPC ...... *G02F 1/13718* (2013.01); *G02F 1/13362* (2013.01); *G02F 2001/133541* (2013.01);
(Continued)

(58) Field of Classification Search
USPC .................................................. 349/175, 185
See application file for complete search history.

(56) References Cited

U.S. PATENT DOCUMENTS 5,877,826 A 3/1999 Yang et al.
6,930,738 B1 * 8/2005 Kaneko ............. G02F 1/133536
349/113
(Continued)

FOREIGN PATENT DOCUMENTS

CN 1470906 A 1/2004
CN 1479141 A 3/2004
(Continued)

OTHER PUBLICATIONS

First Office Action issued by State Intellectual Property Office of the People's Republic of China dated May 4, 2014, 3pgs.
(Continued)

*Primary Examiner* — Lauren Nguyen

(57) ABSTRACT

A liquid crystal display device, which comprises: a backlight source (1); a first handedness cholesteric liquid crystal film layer (2), located at an upper side of the backlight source (1) as a light emitting surface; an array substrate (3), located at an upper side of the first handedness cholesteric liquid crystal film layer (2); a color filter substrate (5), located at an upper side of the array substrate (3); and a second handedness cholesteric liquid crystal layer (4), sandwiched between the array substrate (3) and the color filter substrate (5), the first handedness being opposite to the second handedness. The liquid crystal display device greatly improves light efficiency and transmittance of the display and saves the processing steps and manufacturing costs.

6 Claims, 2 Drawing Sheets

(52) U.S. Cl.
CPC ............ *G02F 2001/133543* (2013.01); *G02F 2001/133567* (2013.01); *G02F 2201/343* (2013.01)

(56) References Cited

U.S. PATENT DOCUMENTS

| | | | |
|---|---|---|---|
| 2001/0026335 A1 | 10/2001 | Moon | |
| 2003/0231266 A1 | 12/2003 | Ma | |
| 2004/0008301 A1 | 1/2004 | Yoon | |
| 2004/0008302 A1 | 1/2004 | Moon | |
| 2007/0064183 A1* | 3/2007 | Huang | G02F 1/13718 349/114 |
| 2014/0055730 A1 | 2/2014 | Zhao | |

FOREIGN PATENT DOCUMENTS

| | | | | |
|---|---|---|---|---|
| CN | 1916713 A | | 2/2007 | |
| CN | 101750784 A | | 6/2010 | |
| CN | 1470912 A | | 7/2012 | |
| CN | 102759823 A | | 10/2012 | |
| JP | 19970507378 A | | 9/1999 | |
| JP | 2000-122059 | * | 4/2000 | |
| JP | 2000122059 A | | 4/2000 | |
| KR | 20040005420 A | | 1/2004 | |
| KR | 20040012191 A | | 1/2004 | |
| KR | 2004-0058843 | * | 7/2004 | |
| KR | 20040058843 A | | 7/2004 | |
| WO | 9705520 A1 | | 2/1997 | |
| WO | WO-97-05520 | * | 2/1997 | G02F 1/1335 |

OTHER PUBLICATIONS

English Translation of First Office Action issued by State Intellectual Property Office of the People's Republic of China dated May 4, 2014, 2pgs.
International Search Report (Chinese language) issued by the International Searching Authority, rendered Jul. 20, 2012, 14 pages.
Espacenet Bibliographic Data, Abstract of KR20040058843(A), 1 page.
Espacenet Bibliographic Data, Abstract of CN102759823(A), 1 page.
Espacenet Bibliographic Data, Abstract of CN1916713(A), 1 page.
Espacenet Bibliographic Data, Abstract of CN101750784(A), 1 page.
English abstract of JP2000122059(A), 10 pages.
Office Action (Korean language) issued by the Korean Intellectual Property Office ("KIPO") on Mar. 30, 2015 for Application No. 10-2013-7014208 (Issuing No. 9-5-2015-021048984), 4 pages.
English translation of Korean Office Action issued by KIPO on Mar. 30, 2015 for Issuing No. 9-5-2015-021048984, 3 pages.
Office Action (Korean Language) issued by the Korean Intellectual Property Office ("KIPO") on Jun. 9, 2015 for Application No. 10-2013-7014208 (Issuing No. 9-5-2015-038644994), 3 pages.
English translation of Korean Office Action issued by KIPO on Jun. 9, 2015 for Application No. 10-2013-7014208 (Issuing No. 9-5-2015-038644994), 2 pages.
Third Office Action (Chinese language) issued by the State Intellectual Property Office ("SIPO") on Apr. 1, 2015 for Application No. 201210259507.X, 3 pages.
English translation of Third Office Action issued by SIPO on Apr. 1, 2015 for Application No. 201210259507.X, 2 pages.
Second Office Action issued by State Intellectual Property Office of the People's Republic of China, in Chinese application No. 201210259507.X, dated Nov. 15, 2014, with Search Report—5pgs.
English Translation ofSecond Office Action issued by State Intellectual Property Office of the People's Republic of China, in Chinese application No. 201210259507.X, dated Nov. 15, 2014, with Search Report—3pgs.
International Preliminary Report on Patentability, for PCT application No. PCT/CN2012/084117, dated Jan. 20, 2015—8 pgs.
English Translation of the Abstract for CN1470906A—1 page.
Extended European Search Report from the European Patent Office in corresponding European Application No. 12852446.9, dated Feb. 3, 2016; 9 pages.
English Abstract of CN1470912.
English abstract of JP19970507378; 1 page.
Japanese Office Action for application 2015-521940 dated Aug. 22, 2016, 2 pages.
English translation of Japanese Office Action for application 2015-521940 dated Aug. 22, 2016, 2 pages.
Disclosure from EPO that WO 97/05520 has published, 1 page.
Initial Publication with ISR for WO/1997/005520, published Feb. 13, 1997, 21 pages.
First Office Action issued by the Korean Intellectual Property Office ("KIPO") on Sep. 29, 2014 for application No. 10-2013-7014208, 4 pages.
English translation of first Office Action issued by KIPO for application No. 10-2013-7014208, 3 pages.
English abstract of KR20040005420A, 1 page.
English abstract of KR20040012191A, 1 page.

* cited by examiner

LIQUID CRYSTAL DISPLAY DEVICE USING DIFFERENT HANDEDNESS CHOLESTERIC LIQUID CRYSTALS

TECHNICAL FIELD

Embodiments of the present invention relate to a liquid crystal display device.

BACKGROUND

Cholesteric liquid crystal comprises a plurality of layers. Molecules are arranged along a same direction in each of the layers, but the arrangement directions of molecules are rotated by an angle of about 15 minutes between any two adjacent layers, so that a spiral structure can be obtained in the stacked layers. When the arrangement of the molecules of an upper layer is rotated by 360 degrees with respect to a lower layer, the distance between the upper layer and the lower layer is a pitch p. According to the direction of the spiral structure, the cholesteric liquid crystal is divided into left-handed cholesteric liquid crystal and right-handed cholesteric liquid crystal, which can respectively reflect left circularly polarized light and right circularly polarized light. The reflection of the cholesteric liquid crystal follows the Bragg law: $\lambda=n*p$ (wherein n is average refractivity of the cholesteric liquid crystal, and p is a pitch of the cholesteric liquid crystal). When the cholesteric liquid crystal is a mixture of a series of liquid crystals having different pitches, it may probably reflect the whole wavelength band of the visible light. The cholesteric liquid crystal may have bistable state characteristic, i.e., being in a planar alignment (after application of a high voltage) or a focal conic alignment (after application of a low voltage) when no power is supplied, while being vertically arranged when it is energized, and at this time, it become equivalent to the normal VA (Vertical Alignment) mode liquid crystal. With cholesteric liquid crystal's reflection performance, cholesteric liquid crystal may be used for manufacturing a reflective polarizer; by making use of its bistable state characteristic, cholesteric liquid crystal may realize reflective liquid crystal display and transparent display.

SUMMARY

Embodiments of the present invention are intended to provide a liquid crystal display device using cholesteric liquid crystal.

One aspect of the present invention provides a liquid crystal display device, comprising: a backlight source; a first handedness cholesteric liquid crystal film layer, located at an upper side of the backlight source as a light emitting surface; an array substrate, located at an upper side of the first handedness cholesteric liquid crystal film layer; a color filter substrate, located at an upper side of the array substrate; and a second handedness cholesteric liquid crystal layer, sandwiched between the array substrate and the color filter substrate, the first handedness being opposite to the second handedness.

In the liquid crystal display device, for example, a reflecting sheet, a reflecting surface of which faces toward the first handedness cholesteric liquid crystal film layer, is disposed at a lower side of the backlight source.

In the liquid crystal display device, for example, the first handedness cholesteric liquid crystal film layer is a left-handed cholesteric liquid crystal film layer; and the second handedness cholesteric liquid crystal layer is a right-handed cholesteric liquid crystal layer.

Or, in the liquid crystal display device, for example, the first handedness cholesteric liquid crystal film layer is a right-handed cholesteric liquid crystal film layer; and the second handedness cholesteric liquid crystal layer is a left-handed cholesteric liquid crystal layer.

In the liquid crystal display device, for example, the array substrate comprises: a lower substrate disposed adjacent to the first handedness cholesteric liquid crystal film layer, and a pixel electrode layer on an upper surface of the lower substrate.

In the liquid crystal display device, for example, the color filter substrate comprises: an upper substrate, and a color filter layer and a common electrode layer sequentially manufactured on a lower surface of the upper substrate.

The liquid crystal display device with the reflective performance and bistable state performance of cholesteric liquid crystal in an embodiment of the present invention has the following advantages: the transmittance of the display is greatly improved; with the provision of a reflective sheet, the light source efficiency is greatly improved, the panel has great brightness, and the energy can be saved; the processing steps and manufacturing costs are reduced.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

Figure 1:
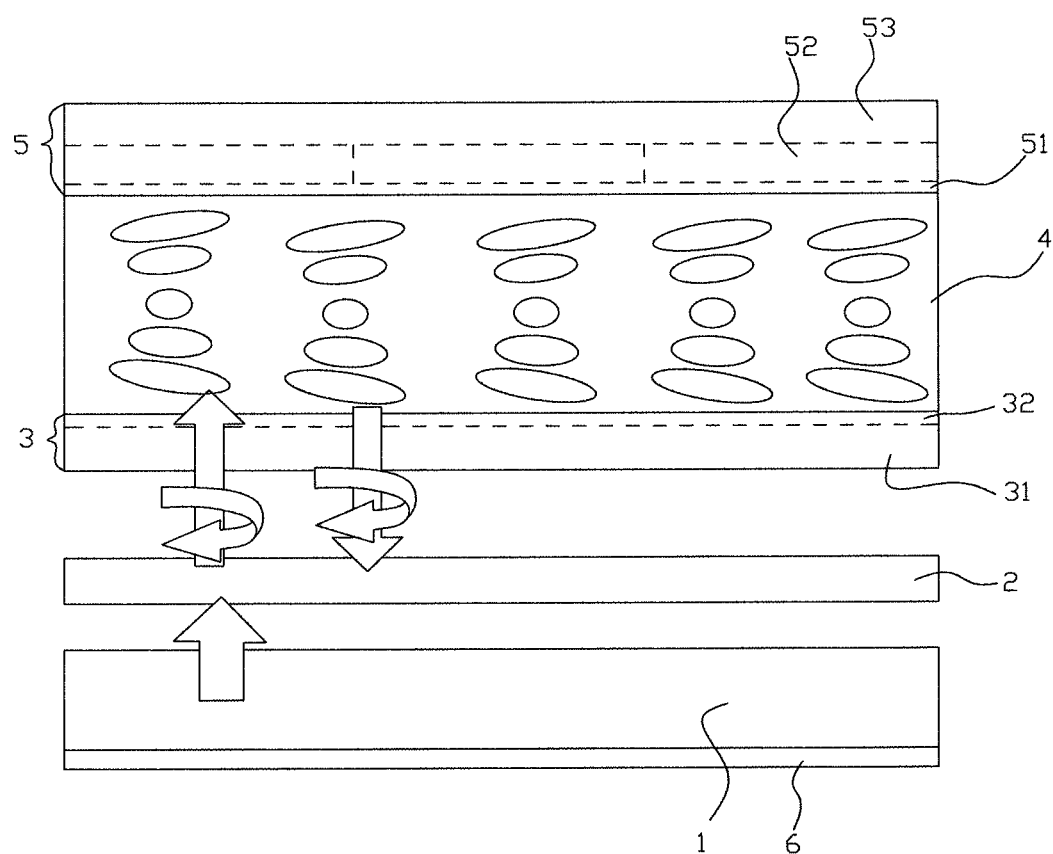
FIG. 1 is a schematic view of a liquid crystal display of the present invention in a dark state.

REFERENCE SIGNS 1 backlight source; 2 left-handed cholesteric liquid crystal film layer; 3 array substrate; 31 lower substrate; 32 pixel electrode layer; 4 right-handed cholesteric liquid crystal layer; 5 color filter substrate; 51 common electrode layer; 52 color filter layer; 53 upper substrate; 6 reflective sheet.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, the technical or scientific terms used herein shall have the general meanings understandable for those ordinarily skilled in the field of the present invention. The words such as "first", "second" or similar used in the description and claims of the present application shall not represent any order, number or importance, but are used for distinguishing between similar elements. The words such as "a", "an", "the" or the like shall not represent limitation of numbers, but mean existence of at least one. The words "include", "comprise" or similar intend to mean the elements or objects before such words cover or are equivalent to the elements or objects listed after such words, but other elements or objects are not exclusive. The words "joint", "connect" or similar are not limited to physical or chemical connection, but also include electrical connection, no matter directly or indirectly. The words "upper", "lower", "left", "right" and etc. shall be used only to represent relative positions, and when the absolute position of the described object is changed, the relative positions may be changed accordingly.

The array substrate in an embodiment of the present invention comprises a plurality of gate lines and a plurality of data lines which intersect each other to define a plurality of pixel units arranged in a matrix, each of the pixel units comprising a thin film transistor (TFT) as a switching element and a pixel electrode for controlling the arrangement of liquid crystal. For example, in each pixel, the gate electrode of the thin film transistor is electrically connected to or integrally formed with a corresponding gate line, a source electrode is electrically connected to or integrally formed with a corresponding data line, and a drain electrode is electrically connected to or integrally formed with a corresponding pixel electrode.

The color filter substrate for example comprises a black matrix and a plurality of color filters in the plurality of pixel units defined by the black matrix. These color filters of the pixel units for example comprise red, green and blue (RGB) filters, and these red, green and blue pixel units are arranged in such a way as to correspond to the pixel units on the array substrate. White light transmits through these color filters and then become corresponding these kinds of color light for color display. The color filter substrate may further comprise a common electrode for cooperating with the pixel electrodes in the pixel units on the array substrate so as to apply an electric field to the liquid crystal.

Although a single pixel unit is described herein, other pixel units may operate similarly.

Figure 2:
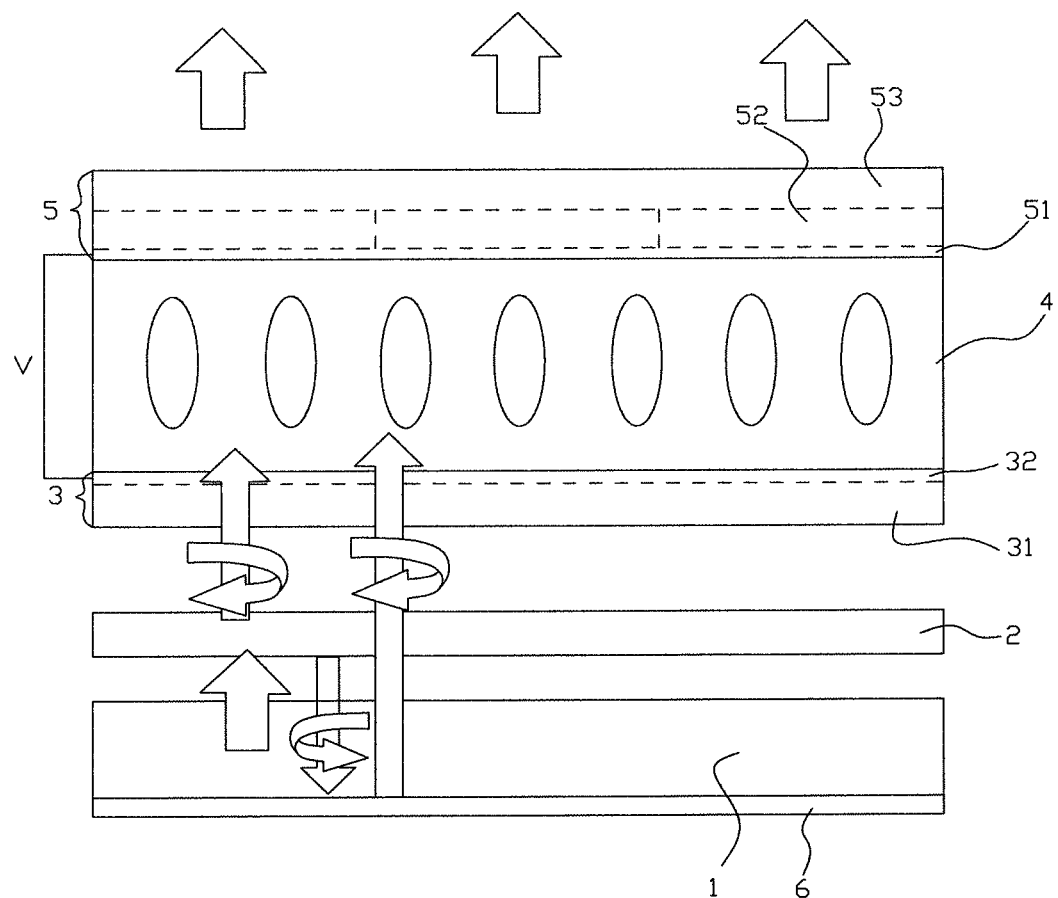
FIG. 2 is a schematic view of the liquid crystal display of the present invention in a bright state.

As shown in FIGS. 1 and 2, the present embodiment discloses a liquid crystal display device, comprising: a backlight source 1; a first handedness cholesteric liquid crystal film layer 2, located at a side of a light emitting surface of the backlight source; a TFT substrate 3, located at an upper side of the first handedness cholesteric liquid crystal film layer 2; a color filter substrate 5, located at an upper side of the TFT substrate 3; and a second handedness cholesteric liquid crystal layer 4, sandwiched between the TFT substrate 3 and the color filter substrate 5. The TFT substrate 3 is an example of the array substrate.

In the present embodiment, "upper side" refers to the side toward the viewing face of the liquid crystal display device, and "lower side" refers to the side away from the liquid crystal display device, as shown in FIGS. 1 and 2.

In the present embodiment, a reflective sheet 6, a reflecting surface of which faces toward the first handedness cholesteric liquid crystal film layer 2, is disposed at a lower side of the backlight source 1. That is, the backlight source 1 is sandwiched between the first handedness cholesteric liquid crystal film layer 2 and the reflective sheet 6, which are opposite to each other. In another embodiment of the present invention, the lower side of the backlight source 1 may not be provided with a reflective sheet, although the embodiment without a reflective sheet may have a lowered utilization efficiency of the light source. The reflective sheet 6, for example, may be a metal sheet or a plastic sheet plated with a metal reflective layer on the surface.

In the present embodiment, the first handedness cholesteric liquid crystal film layer 2 is a left-handed cholesteric liquid crystal film layer; the second handedness cholesteric liquid crystal layer 4 is a right-handed cholesteric liquid crystal layer. In another embodiment of the present invention, the first handedness cholesteric liquid crystal film layer 2 may be a right-handed cholesteric liquid crystal film layer; the second handedness cholesteric liquid crystal layer 4 may be a left-handed cholesteric liquid crystal layer. For example, these left-handed and right-handed cholesteric liquid crystals each may be made of known liquid crystal materials in the relevant technical field, and no more details are described herein for simplicity.

The backlight source 1 may be a direct lighting type or an edge lighting type backlight source, and, for example, it may adopt a cold cathode fluorescent lamp (CCFL) or light emitting diodes (LEDs) as a light source.

During operation, the light emitted from the backlight source 1 includes left-handed polarized light and right-handed polarized light. According to the reflective characteristics of the cholesteric liquid crystal, the left-handed cholesteric liquid crystal film reflects left-handed polarized light and transmits right-handed polarized light therethrough; the right-handed cholesteric liquid crystal film reflects right-handed polarized light and transmits left-handed polarized light therethrough. As a result, for the embodiment shown in FIG. 1, only the right-handed light among the light emitted from the backlight source 1 is transmitted through the left-handed cholesteric liquid crystal film layer 2, while the left-handed polarized light are reflected. That is, only a half of the light is transmitted through and the other half is reflected by the left-handed cholesteric liquid crystal film layer 2. The reflected left-handed polarized light return to the left-handed cholesteric liquid crystal film layer 2 after being reflected at the reflective sheet 6. Since the left-handed polarized light is changed into right-handed polarized light after being reflected and can be transmitted through the left-handed cholesteric liquid crystal film layer 2. Therefore, where the reflective sheet 6 is provided, all the light emitted from the backlight source 1 may pass through the left-handed cholesteric liquid crystal film layer 2 in the form of right-handed polarized light.

An illustrative diagram of the liquid crystal display device in a dark state of the present embodiment is shown in FIG. 1.

In the dark state, the right-handed cholesteric liquid crystal layer 4 corresponding to a pixel unit is in planar alignment of the bistable state and will reflect the right-handed polarized light. As stated before, all of the light emitted from the backlight source 1 is changed into right-handed polarized light after passing through the left-handed cholesteric liquid crystal film layer 2, so all the light (right-handed polarized light) is reflected by the right-handed cholesteric liquid crystal layer and can not be transmitted therethrough, whereby the liquid crystal display device presents the dark state.

An illustrative diagram of the liquid crystal display device in a bright state of the present embodiment is shown in FIG. 2.

In the bright state, when the right-handed cholesteric liquid crystal layer 4 corresponding to a pixel unit is energized through for example the pixel electrode and the common electrode, the right-handed cholesteric liquid crystal is changed into vertical alignment, which is equivalent to the arrangement of the VA mode. As stated before, all of the light emitted from the backlight source 1 is changed into right-handed polarized light after passing through the left-handed cholesteric liquid crystal film layer 2, so all of the right-handed polarized light can be transmitted through the right-handed cholesteric liquid crystal layer 4, whereby the bright state is presented.

In the present embodiment, as shown in FIGS. 1 and 2, the TFT substrate 3 may comprise: a lower substrate 31 disposed adjacent to the first handedness cholesteric liquid crystal film layer 2, and a pixel electrode layer 32 on an upper surface of the lower substrate 31.

The color filter substrate 5 may comprise: an upper substrate 53, and a color filter layer 52 and a common electrode layer 51 sequentially manufactured on a lower surface of the upper substrate 53.

In the present embodiment, "upper surface" refers to the surface of the side toward the viewing face of the liquid crystal display device, and "lower surface" refers to the surface of the side away from the liquid crystal display device, as shown in FIGS. 1 and 2.

In other embodiment of the present invention, a film layer or structure having other function, e.g. an antireflection film and etc., may be added to the liquid crystal display device according to requirements.

The liquid crystal display devices in the above embodiments of the present invention do not need polarizers for display so that the transmittance of the display device is greatly improved. At the same time, with provision of the reflective sheet, the light emitted from the backlight source 1 may be reused after being reflected, so that the light source efficiency is greatly improved, the panel has great brightness, and the energy can be saved. During the process of manufacturing the liquid crystal display devices in the embodiments of the present invention, since there is no need of any alignment film or orientation process, the processing steps and manufacturing costs are reduced.

The above embodiments of the present invention are given by way of illustration only and thus are not limitative of the protection scope of the present invention, which is determined by the attached claims.

The invention claimed is:

1. A liquid crystal display device, comprising: a backlight source; a first handedness cholesteric liquid crystal film layer, located at an upper side of the backlight source as a light emitting surface; an array substrate, located at an upper side of the first handedness cholesteric liquid crystal film layer; a color filter substrate, located at an upper side of the array substrate; and a second handedness cholesteric liquid crystal layer, sandwiched between the array substrate and the color filter substrate, the first handedness being opposite to the second handedness,
   wherein the array substrate comprises a lower substrate disposed adjacent to the first handedness cholesteric liquid crystal film layer, and a pixel electrode layer on an upper surface of the lower substrate,
   wherein the color filter substrate comprises: an upper substrate, and a color filter layer and a common electrode layer sequentially manufactured on a lower surface of the upper substrate, and
   wherein the pixel electrode layer and the common electrode layer are configured to energize the second handedness cholesteric liquid crystal layer, and the second handedness cholesteric liquid crystal layer is arranged in a planar alignment when not energized, and is arranged in a vertical alignment when energized.

2. The liquid crystal display device according to claim 1, wherein a reflecting sheet, a reflecting surface of which faces toward the first handedness cholesteric liquid crystal film layer, is disposed at a lower side of the backlight source.

3. The liquid crystal display device according to claim 1, wherein the first handedness cholesteric liquid crystal film layer is a left-handed cholesteric liquid crystal film layer; and the second handedness cholesteric liquid crystal layer is a right-handed cholesteric liquid crystal layer.

4. The liquid crystal display device according to claim 1, wherein the first handedness cholesteric liquid crystal film layer is a right-handed cholesteric liquid crystal film layer; and the second handedness cholesteric liquid crystal layer is a left-handed cholesteric liquid crystal layer.

5. The liquid crystal display device according to claim 2, wherein the first handedness cholesteric liquid crystal film layer is a left-handed cholesteric liquid crystal film layer; and the second handedness cholesteric liquid crystal layer is a right-handed cholesteric liquid crystal layer.

6. The liquid crystal display device according to claim 2, wherein the first handedness cholesteric liquid crystal film layer is a right-handed cholesteric liquid crystal film layer; and the second handedness cholesteric liquid crystal layer is a left-handed cholesteric liquid crystal layer.

* * * * *